United States Patent
Yoo et al.

(10) Patent No.: US 10,575,632 B2
(45) Date of Patent: Mar. 3, 2020

(54) CABLE MANAGEMENT SYSTEM FOR MOBILE DEVICE SUPPORT, WORKSURFACE HAVING A MOBILE DEVICE SUPPORT AND METHOD FOR THE USE THEREOF

(71) Applicant: Steelcase Inc., Grand Rapids, MI (US)

(72) Inventors: Hyun Yoo, Grand Rapids, MI (US); Lin Lih Goh, Selangor (MY); Ming Yoong Tham, Puchong Selangor (MY); Michael Held, Hong Kong (CN)

(73) Assignee: STEELCASE INC., Grand Rapids, MI (US)

( * ) Notice: Subject to any disclaimer, the term of this patent is extended or adjusted under 35 U.S.C. 154(b) by 0 days.

(21) Appl. No.: 16/069,809

(22) PCT Filed: Jan. 14, 2016

(86) PCT No.: PCT/US2016/013391
§ 371 (c)(1),
(2) Date: Jul. 12, 2018

(87) PCT Pub. No.: WO2017/123228
PCT Pub. Date: Jul. 20, 2017

(65) Prior Publication Data
US 2019/0029415 A1    Jan. 31, 2019

(51) Int. Cl.
*A47B 21/06* (2006.01)
*F16M 13/02* (2006.01)

(52) U.S. Cl.
CPC .......... *A47B 21/06* (2013.01); *F16M 13/02* (2013.01)

(58) Field of Classification Search
CPC .... A47B 2200/0082; A47B 2200/0083; A47B 2200/008; A47B 21/00; B60N 3/004; B64D 11/0638; A47C 7/70
(Continued)

(56) References Cited

U.S. PATENT DOCUMENTS 4,372,629 A * 2/1983 Propst .................. A47B 21/06
                                                        248/52
4,721,476 A    1/1988 Zeliff et al.
(Continued)

FOREIGN PATENT DOCUMENTS

WO    WO2011/080653    7/2011

OTHER PUBLICATIONS

International Search Report for International Application No. PCT/US2016/013391 dated Mar. 16, 2016 (1 page).

*Primary Examiner* — Jose V Chen
(74) *Attorney, Agent, or Firm* — Brinks Gilson & Lione

(57) ABSTRACT

A cable management system includes a support having a peripheral edge defining a central opening and a longitudinally extending channel having a laterally extending bottom shelf and an upwardly extending retainer wall. At least one of the bottom shelf and retainer wall have a pass-through opening formed there through. The channel is positioned adjacent to a portion of the peripheral edge of the support with the retainer wall laterally spaced apart from the portion of the peripheral edge so as to form a gap there between defining a mouth of the channel. A door is moveably coupled to the support. The door is moveable between a first position, wherein at least a portion of the central opening defined by the support is uncovered, and a second position, wherein the portion of central opening defined by the support is covered. A worksurface assembly and method of use are also provided.

26 Claims, 8 Drawing Sheets

(58) Field of Classification Search
USPC .................. 108/50.02; 312/223.1, 223.6
See application file for complete search history.

(56) References Cited

U.S. PATENT DOCUMENTS

| | | | |
|---|---|---|---|
| 4,762,072 A * | 8/1988 | Boundy | A47B 21/06 |
| | | | 108/50.02 |
| 4,792,881 A | 12/1988 | Wilson et al. | |
| 5,230,552 A | 7/1993 | Schipper et al. | |
| 5,231,562 A | 7/1993 | Pierce et al. | |
| 5,237,935 A | 8/1993 | Newhouse et al. | |
| 5,709,156 A | 1/1998 | Gevaert et al. | |
| 5,860,713 A | 1/1999 | Richardson | |
| 5,878,673 A * | 3/1999 | Kramer | A47B 87/002 |
| | | | 108/50.02 |
| 6,162,071 A | 12/2000 | Muller | |
| 6,176,561 B1 | 1/2001 | Roels et al. | |
| 6,338,301 B1 | 1/2002 | Almond | |
| 6,629,505 B1 | 10/2003 | Cronk et al. | |
| 6,848,226 B1 | 2/2005 | Boyd et al. | |
| 6,979,209 B2 | 12/2005 | Griepentrog | |
| 7,191,713 B2 | 3/2007 | Gayhart et al. | |
| 7,312,393 B2 | 12/2007 | McCarthy | |
| 7,407,392 B2 | 8/2008 | Cooke et al. | |
| 7,578,243 B2 | 8/2009 | Gevaert | |
| 7,674,119 B1 | 3/2010 | McCarthy | |
| 7,926,430 B2 | 4/2011 | Bakker et al. | |
| 7,966,951 B1 | 6/2011 | Black et al. | |
| 8,013,242 B1 | 9/2011 | Thibault et al. | |
| 8,030,892 B2 | 10/2011 | Fang et al. | |
| 8,109,215 B2 * | 2/2012 | Kitada | A47B 21/00 |
| | | | 108/50.02 |
| 8,119,910 B1 | 2/2012 | Golden et al. | |
| 8,480,188 B2 | 7/2013 | Cao et al. | |
| 8,596,588 B1 | 12/2013 | Sikkema et al. | |
| 8,720,348 B2 | 5/2014 | Roh | |
| 8,875,637 B2 | 11/2014 | Sherman et al. | |
| 8,925,469 B2 | 1/2015 | Bennie et al. | |
| 8,943,978 B2 | 2/2015 | Soper et al. | |
| 9,078,348 B1 | 7/2015 | Grandin et al. | |
| 10,232,796 B2 * | 3/2019 | Barnes | B60N 3/002 |
| 2005/0167138 A1 | 8/2005 | McCarthy | |
| 2005/0178297 A1 * | 8/2005 | Pipkin | A47B 23/00 |
| | | | 108/25 |
| 2005/0268823 A1 | 12/2005 | Bakker et al. | |
| 2005/0279257 A1 * | 12/2005 | Bettinger | A47B 21/0314 |
| | | | 108/50.02 |
| 2007/0077800 A1 | 4/2007 | Isaacks | |
| 2007/0283855 A1 * | 12/2007 | Pozzi | A47B 23/043 |
| | | | 108/44 |
| 2013/0061783 A1 | 3/2013 | Bennie et al. | |
| 2013/0314861 A1 * | 11/2013 | Burford | H05K 7/00 |
| | | | 361/679.01 |
| 2013/0327255 A1 * | 12/2013 | Pajic | A47B 23/00 |
| | | | 108/25 |
| 2014/0124641 A1 | 5/2014 | Kassanoff et al. | |
| 2014/0377499 A1 * | 12/2014 | Davino | B64D 11/0638 |
| | | | 428/99 |
| 2015/0108798 A1 * | 4/2015 | Boyer, Jr. | B64D 11/0638 |
| | | | 297/163 |
| 2015/0244127 A1 * | 8/2015 | Kim | B60N 3/14 |
| | | | 439/34 |
| 2016/0059795 A1 * | 3/2016 | Rook | B60N 3/004 |
| | | | 108/25 |
| 2016/0249073 A1 * | 8/2016 | Margis | H04N 21/2146 |
| 2016/0274674 A1 * | 9/2016 | Valdes | B64D 11/0015 |
| 2016/0298808 A1 * | 10/2016 | Boyer | F16M 13/022 |
| 2017/0042323 A1 * | 2/2017 | Johnson | A47B 21/06 |

* cited by examiner

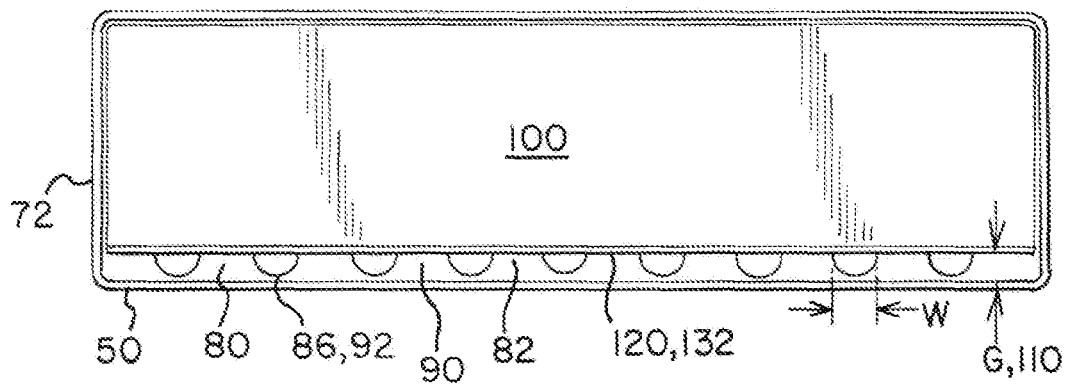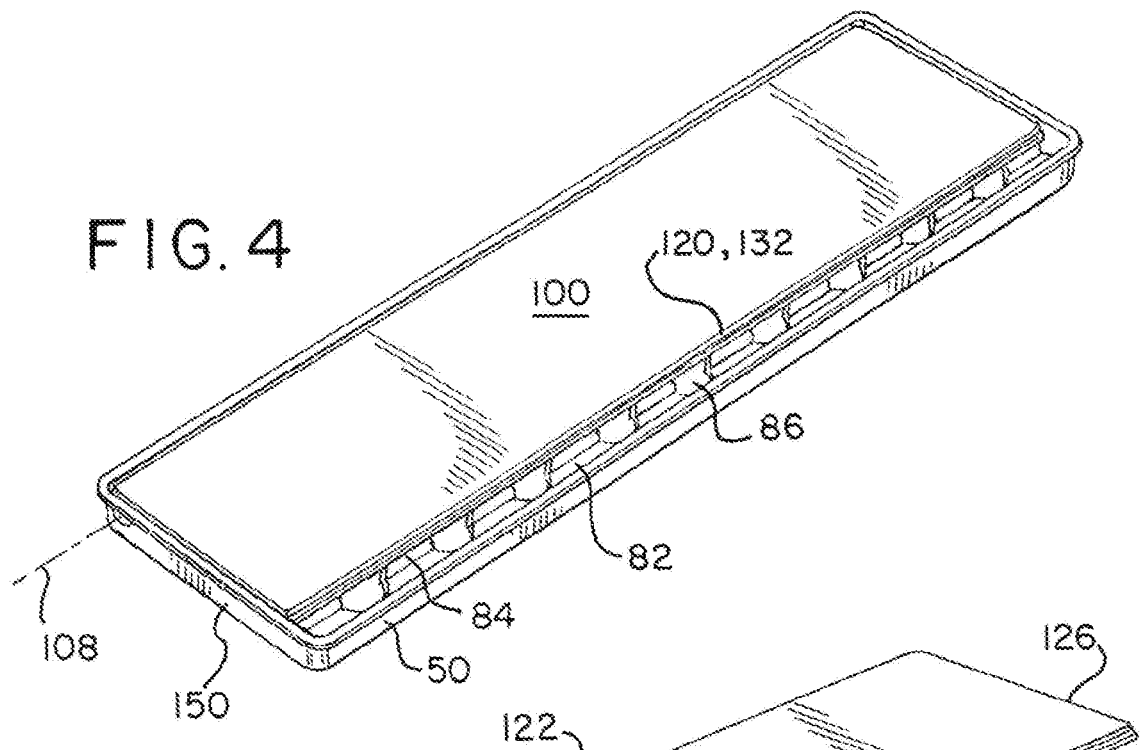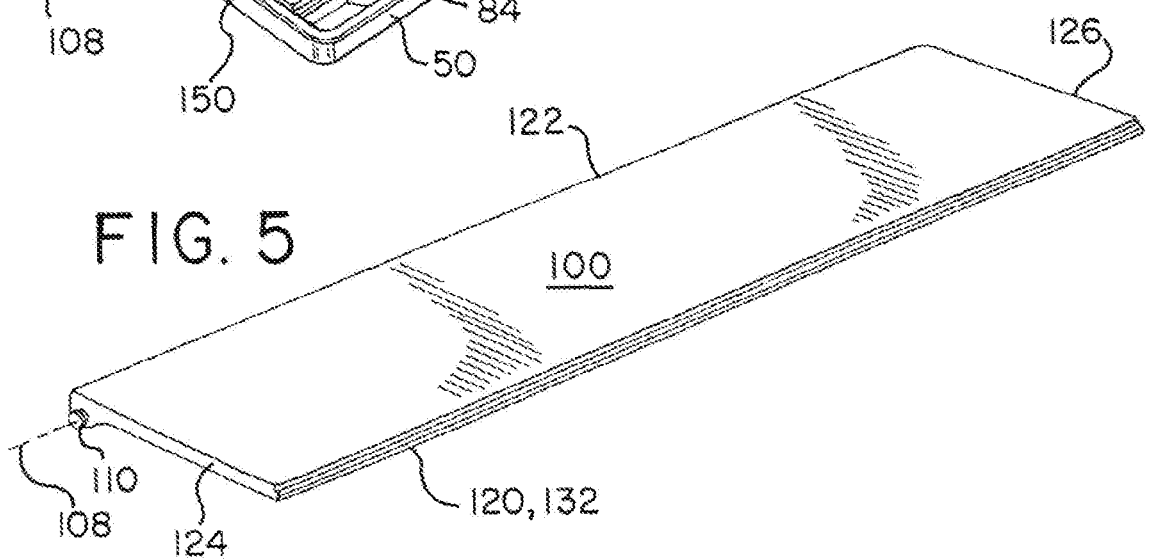

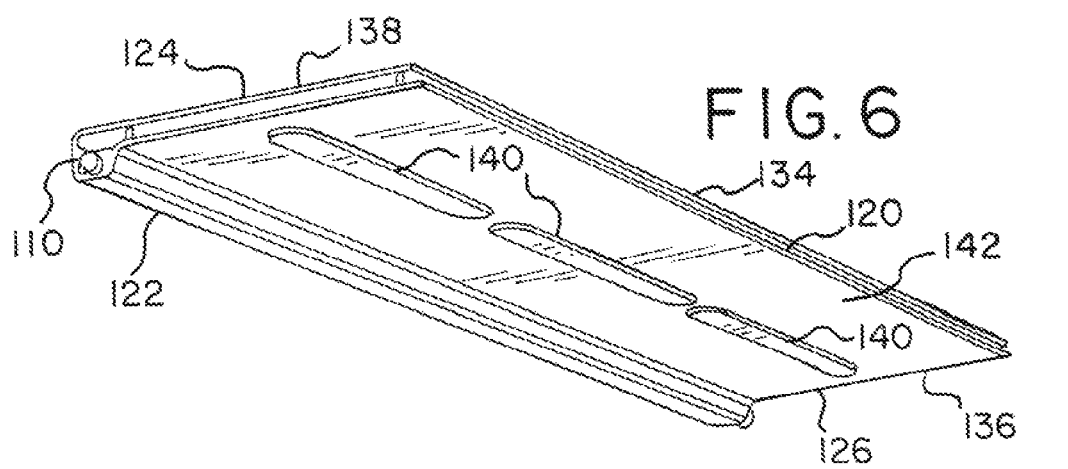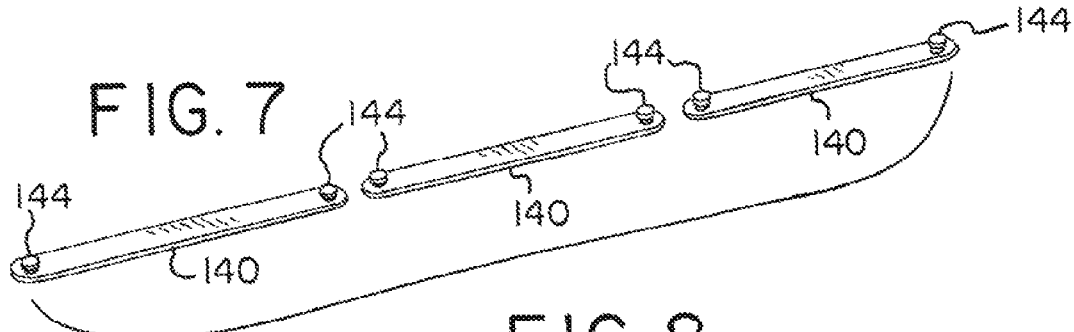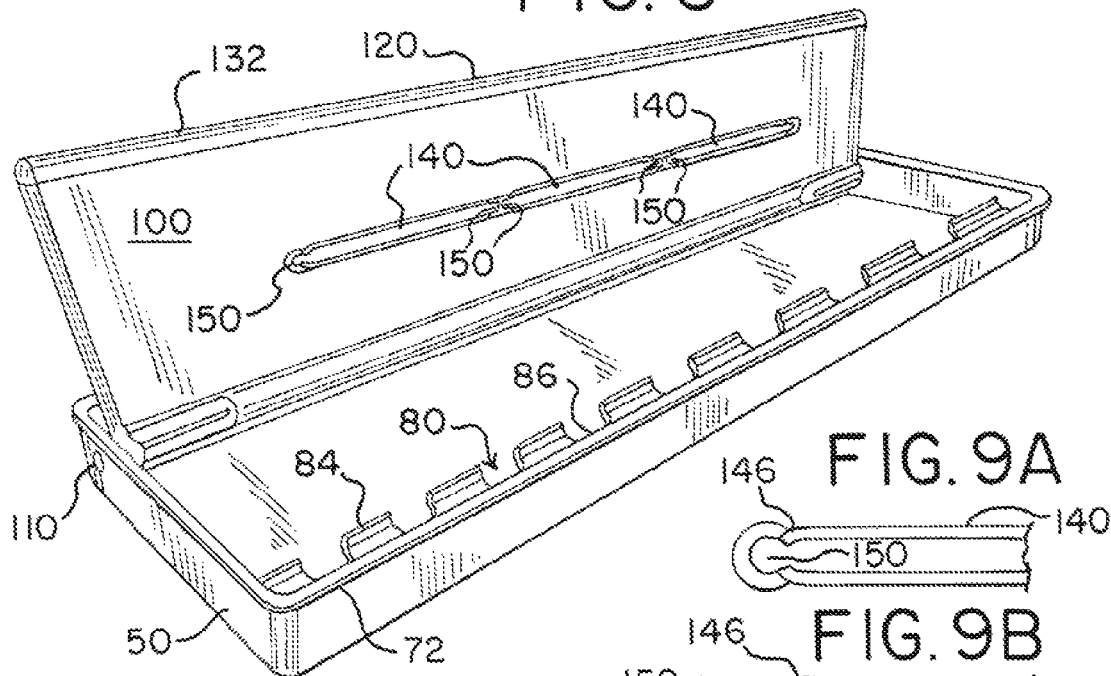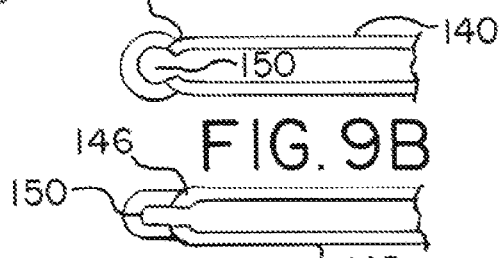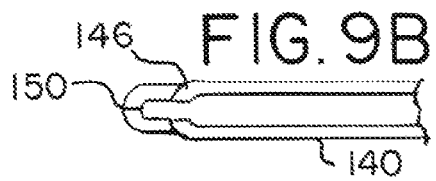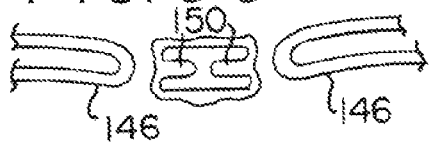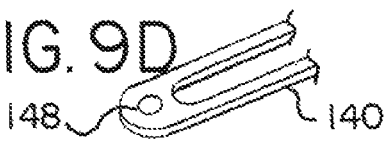

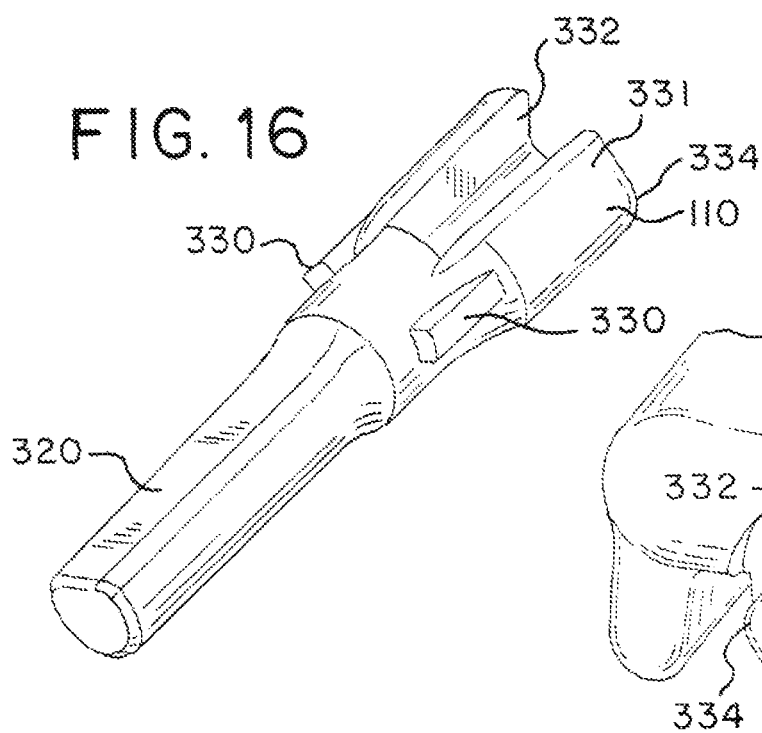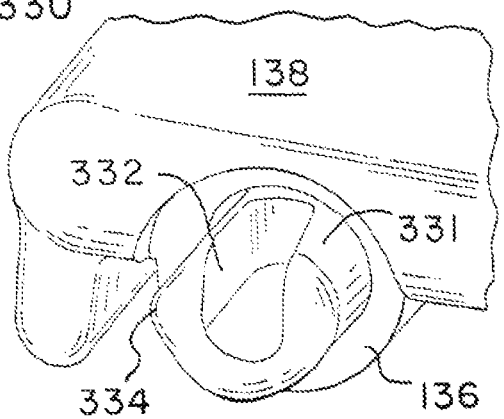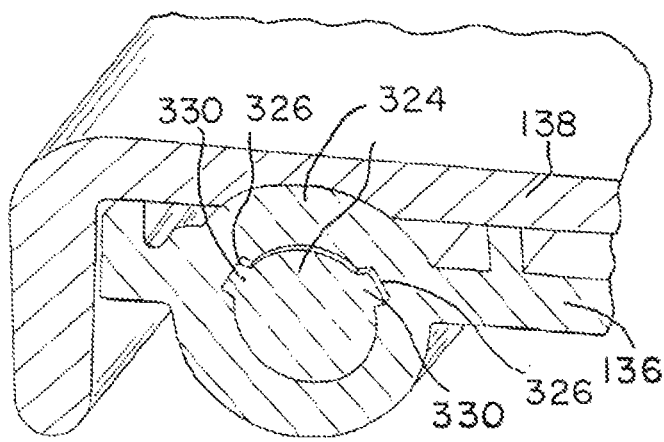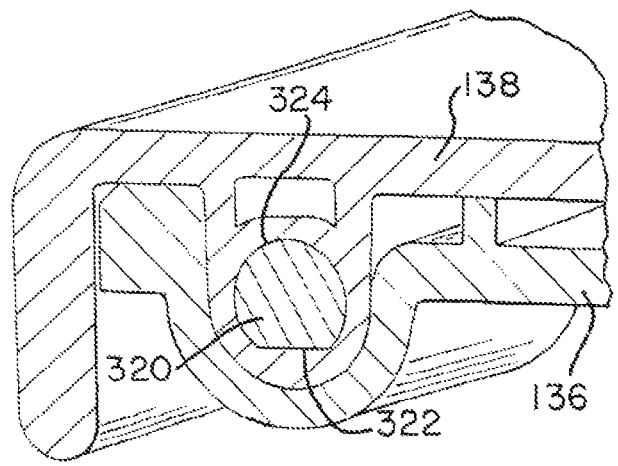

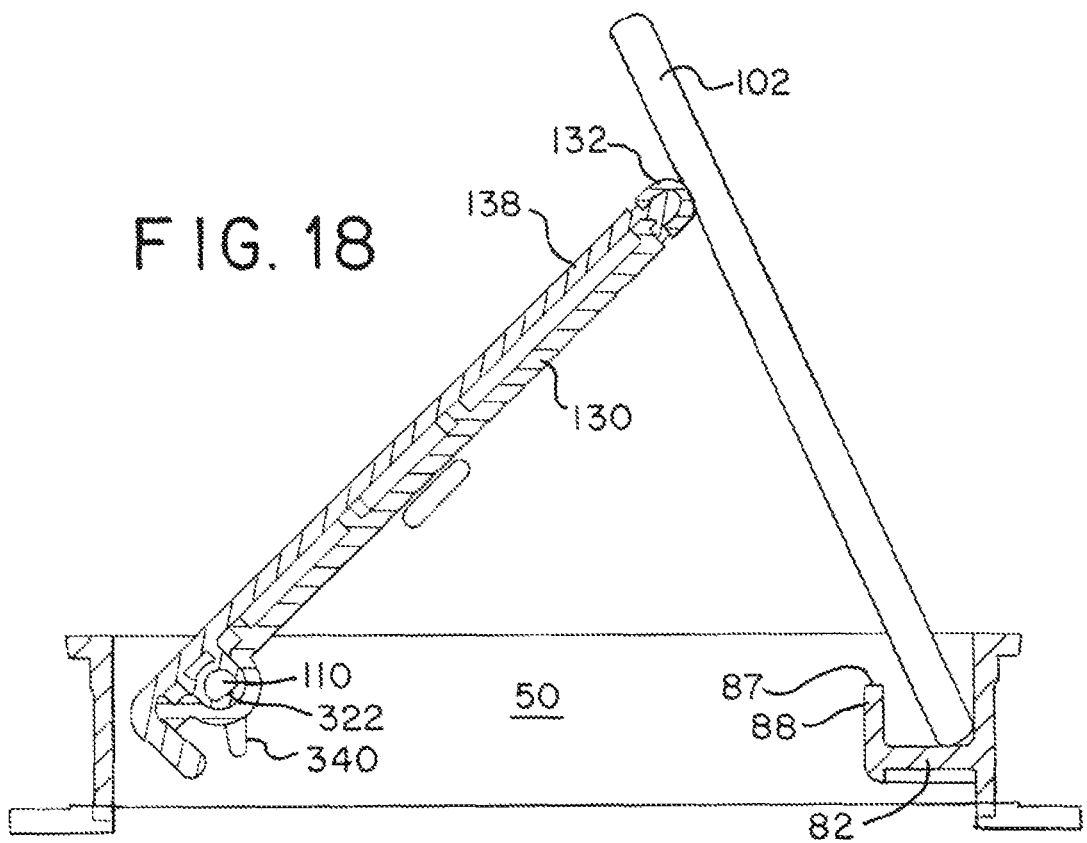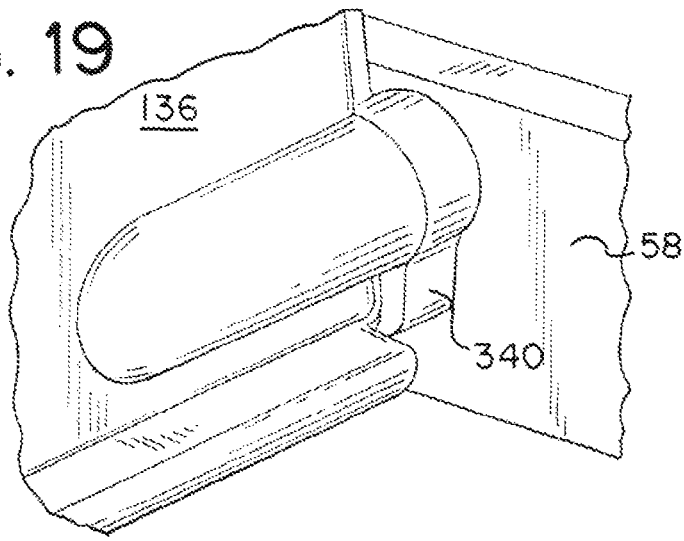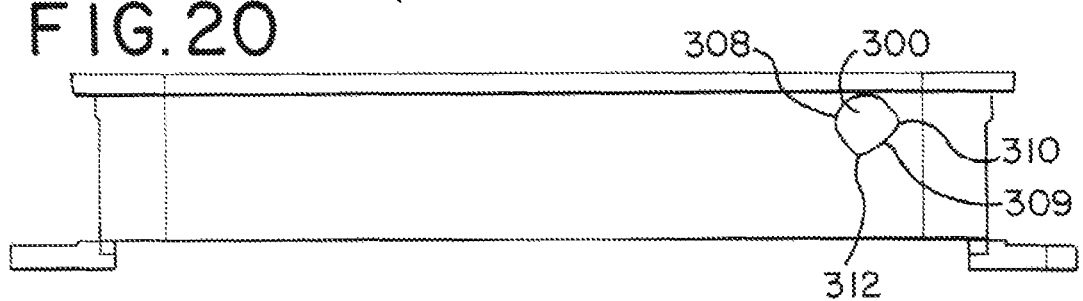

CABLE MANAGEMENT SYSTEM FOR MOBILE DEVICE SUPPORT, WORKSURFACE HAVING A MOBILE DEVICE SUPPORT AND METHOD FOR THE USE THEREOF

FIELD OF THE INVENTION

The present application relates generally to a cable management system for a mobile device support, together with a worksurface having a mobile device support and methods for the use and assembly thereof.

BACKGROUND

Mobile devices, including smartphones and tablet computers, are frequently used as hand-held devices, with a user manipulating and viewing the device with their hands. Often, however, it may be desirable for the user to view the mobile device hands-free, for example when occupied with other tasks such as writing, reading and/or eating. In these situations, it may be difficult to achieve an appropriate positioning of the device, for example at an angle relative to a support surface, such that the screen may be properly viewed. This problem may be exacerbated when the mobile device is being charged, for example with a power cord or USB cable, with such cords/cables typically being secured to the bottom of the device, which may interfere with the support of the device in an upright position.

SUMMARY

The present invention is defined by the following claims, and nothing in this section should be considered to be a limitation on those claims.

In one aspect, one embodiment of a cable management system includes a support having a peripheral edge defining a central opening and a longitudinally extending channel having a laterally extending bottom shelf and an upwardly extending retainer wall. At least one of the bottom shelf and retainer wall have a pass-through opening formed there through. The channel is positioned adjacent to a portion of the peripheral edge of the support with the retainer wall laterally spaced apart from the portion of the peripheral edge so as to form a gap there between defining a mouth of the channel. A door is moveably coupled to the support. The door is moveable between a first position, wherein at least a portion of the central opening defined by the support is uncovered, and a second position, wherein the portion of central opening defined by the support is covered.

In another aspect, one embodiment of a worksurface assembly includes a worksurface member having an upper support surface, a front edge, and a through opening, with the through opening defined in part by a front peripheral edge. A longitudinally extending channel has a laterally extending bottom shelf and an upwardly extending retainer wall, with at least one of the bottom shelf and the retainer wall having a pass-through opening formed there through. The channel is positioned adjacent to the front peripheral edge with the retainer wall laterally spaced apart from the front peripheral edge so as to form a gap there between defining a mouth of the channel. A door is moveably coupled to the worksurface member. The door is moveable between a first position, wherein at least a portion of the through opening is uncovered and a front edge of the door is positioned above the upper support surface, and a second position, wherein the portion of the through opening is covered and the front edge is substantially coplanar with the worksurface member.

In yet another aspect, one embodiment of a method of supporting a mobile device includes moving a door from a first position, wherein a front edge of the door is positioned above the worksurface, to a second position, wherein the front edge of the door is substantially parallel to the worksurface, and supporting an edge of a mobile device on a bottom shelf of a channel coupled to the worksurface. The channel has a retainer wall positioned adjacent a rear surface of the mobile device, wherein one of the bottom shelf and the retainer wall have a pass-through opening positioned adjacent the mobile device. The method further includes supporting the rear surface of the mobile device with the front edge of the door when the door is in the first position.

The various embodiments of the cable management system and worksurface assembly provide significant advantages over other systems and worksurfaces. For example and without limitation, the cable management system may be easily incorporated into various assemblies, including various furniture components such as desks, tables, and countertops, and also various vehicles, including various interior features thereof. The cable management system, and worksurface, provides a stable support allowing the user to position their mobile device at various angles suitable for viewing. At the same time, the user may tether the device in any of the viewing positions, for example by connecting the device to a power cord or USB cable.

The foregoing paragraphs have been provided by way of general introduction, and are not intended to limit the scope of the following claims. The various preferred embodiments, together with further advantages, will be best understood by reference to the following detailed description taken in conjunction with the accompanying drawings.

BRIEF DESCRIPTION OF THE DRAWINGS

FIG. 3 is a top view of a cable management system.

FIG. 4 is a top perspective view of the cable management system shown in FIG. 3.

FIG. 5 is a top perspective view of a door for a cable management system.

FIG. 6 is a bottom perspective view of the door shown in FIG. 5 without any edge trim.

FIG. 7 is a perspective view of one embodiment of a plurality of storage straps.

FIG. 8 is a perspective view of a cable management system in an open configuration with an alternative embodiment of a plurality of storage straps.

FIGS. 9A-D show various embodiments of storage straps and/or door interfaces.

FIG. 16 is a perspective view of a hinge pin.

FIGS. 17A-C are progressive cross-sectional views of the hinge pin and door.

FIG. 18 is a cross-sectional view of the cable management system supporting a mobile device.

FIG. 19 is an enlarged view of the door in an open position.

FIG. 20 is a side view of a frame having a socket.

DETAILED DESCRIPTION OF THE PRESENTLY PREFERRED EMBODIMENTS

Figure 1:
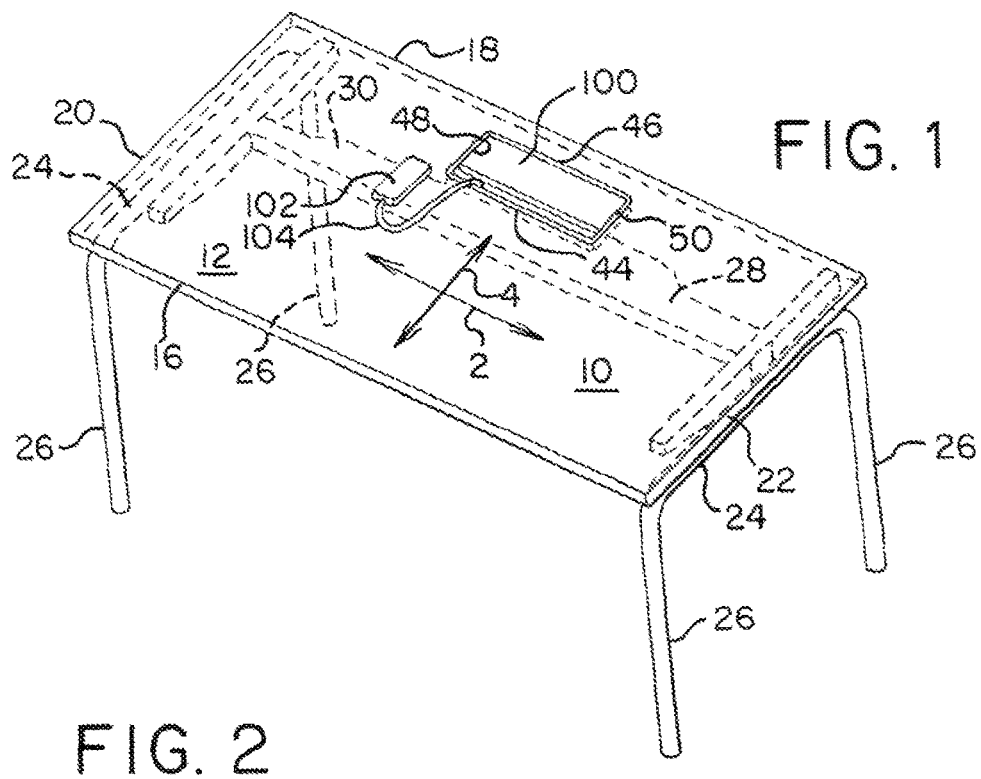
FIG. 1 is a perspective view of one embodiment of a worksurface assembly.

It should be understood that the term "plurality," as used herein, means two or more. The term "longitudinal," as used herein means of or relating to length or the lengthwise direction 2, for example a direction running from side to side of the worksurface or cable management system. The term "lateral," as used herein, means situated on, directed toward or running in a direction 4 orthogonal to the longitudinal direction, for example from front to back of the worksurface or cable management system. The term "coupled" means connected to or engaged with whether directly or indirectly, for example with an intervening member, and does not require the engagement to be fixed or permanent, although it may be fixed or permanent. For example, a door may be coupled to the worksurface directly with a hinge, or indirectly via a frame. The terms "first," "second," and so on, as used herein are not meant to be assigned to a particular component so designated, but rather are simply referring to such components in the numerical order as addressed, meaning that a component designated as "first" may later be a "second" such component, depending on the order in which it is referred. It should also be understood that designation of "first" and "second" does not necessarily mean that the two components or values so designated are different, meaning for example a first direction may be the same as a second direction, with each simply being applicable to different components.

Worksurface:

Referring to the drawings, FIGS. 1, 2, 13 and 15 shows an embodiment of a worksurface assembly including a worksurface member 10 having an upper support surface 12, a bottom surface 14, front and rear laterally spaced edges 16, 18 and opposite longitudinally spaced side edges 20, 22. The phrase "worksurface member" refers to any member used to provide a landing or support, including without limitation desktops, table tops, cabinets, shelving, countertops, seatback trays, and vehicle (ground supported and airborne) interiors, including consoles, dashboards, trays, and the like. It should be understood that the worksurface member may have other plan view shapes besides the rectangular shape shown, including for example and without limitation various elliptical (including circular), obround, oval and polygonal shapes, and further that one or more of the front, rear and side edges may be linear, curved or curvilinear. In an embodiment having an elliptical/round, obround, oval or other non-rectangular shape, the portion of the peripheral edge facing the user in an intended seated or standing position is defined as the front edge.

In one embodiment, the worksurface member 10 is supported by one or more support members 24, shown as four legs 26, although it should be understood that in other embodiments, the worksurface member may be supported by other supports, including without limitation pedestal, adjacent supports, cabinets and walls. The worksurface member may be supported on the bottom surface 14 thereof, or may be cantilevered, for example by attachment to an adjacent wall, whether permanent or a wall panel. The worksurface member 10 may be made of any suitable material, such as wood, metal, plastic, composite or combinations thereof. In the embodiment shown in FIG. 1, the support members 24 include a pair of longitudinally spaced U-shaped supports defining the legs 26. A longitudinally extending beam 28 extends between and is coupled to the support members 24. In one embodiment, the beam 28 includes a utility raceway 30, which may house various utilities such as power and data lines, connectors and other hardware.

Figure 13:
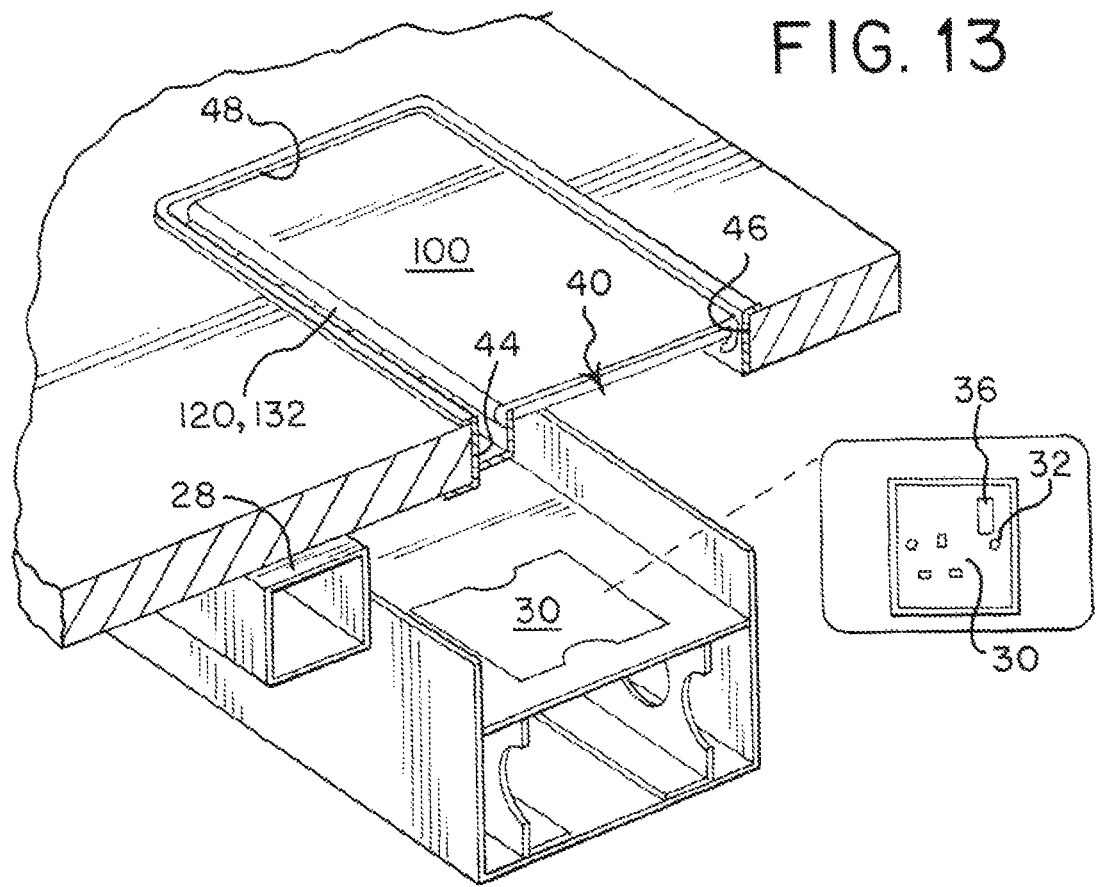
FIG. 13 is an exploded, cross-sectional view of worksurface with a cable management system and power supply.
Figure 15:
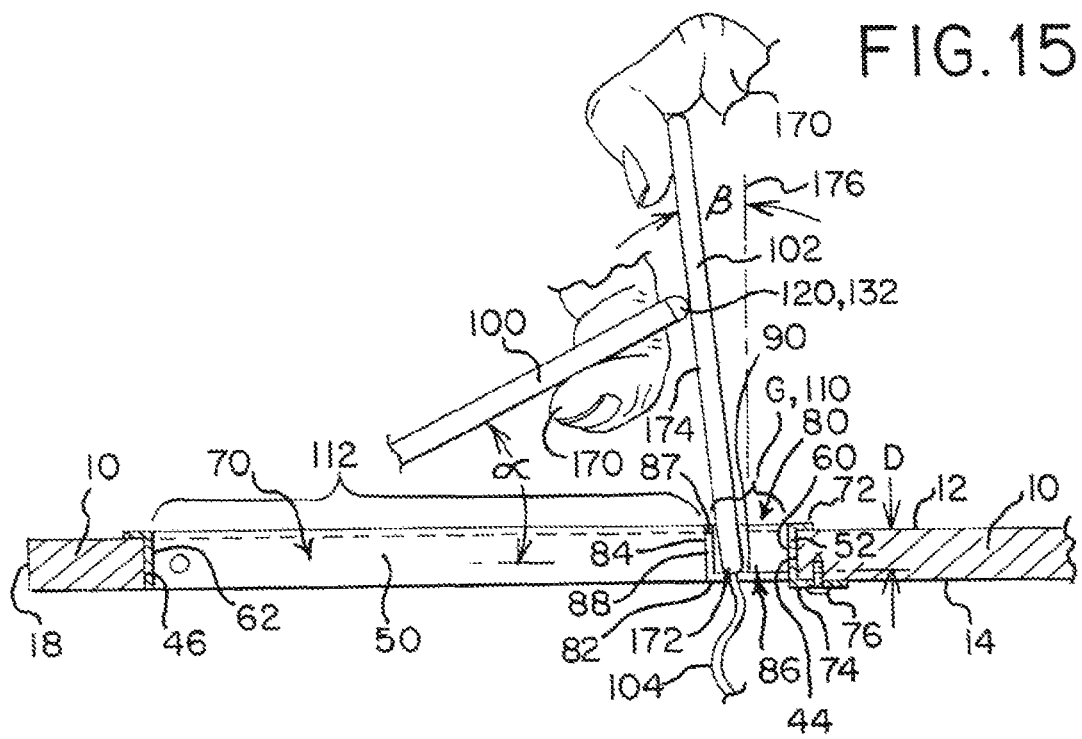
FIG. 15 is a partial cross sectional view of a worksurface assembly supporting a mobile device.

Referring to FIGS. 1 and 13, one or more (e.g., a plurality of) power receptacles 32 may be supported by the beam and connected to the utilities, such that the receptacle 32 may supply power and data, individually and combined, to a user positioned adjacent the worksurface. For example, the receptacle 32 may include an electrical power outlet 34 as well as a USB port 36.

In one embodiment, the worksurface member 10 has a through opening 40 positioned above the receptacle(s) 32 to provide access to the receptacle(s) 32 from the upper support surface 12 of the worksurface. It should be understood that the phrase "through opening" refers to an opening through the upper surface of the worksurface, but that a surface may be disposed beneath the opening, for example to form a cavity. The through opening 40 is defined by a peripheral edge 42, which in embodiment has a front, rear and opposite side peripheral edges 44, 46, 48, 50, all of which are linear in one embodiment. It should be understood that the through opening 40 may have, without limitation, an elliptical (including circular), obround, oval or polygonal shape, and further that one or more of the front, rear and side peripheral edges may be linear, curved or curvilinear.

Cable Management System:

Referring to FIGS. 1-5, 8, 10, 11 and 15, a cable management system is shown as including a support having a peripheral edge defining a central opening. It should be understood that the support may be formed as a ring-like frame 50, or may be defined by the peripheral edge 42 of the through opening of the worksurface member. In the latter embodiment, the central opening corresponds to the through opening 40. In the former embodiment, the frame 50 is shaped to mate with the through opening 40 of the worksurface, and may be configured with front, rear and opposite side peripheral edges 60, 62, 64, 66, defined by front, rear, and opposite side walls 52, 54, 56, 58, all of which are linear in one embodiment. The side walls 52, 54, 56, 58 also define a through opening 70 which corresponds to a central opening. The corners 68 of the frame are preferably curved.

It should be understood that the through opening 70, and corresponding central opening, may have, without limitation, an elliptical (including circular), obround, oval or polygonal shape, and further that one or more of the front, rear and side peripheral edges 60, 62, 64, 66 may be linear, curved or curvilinear. The frame 50 is configured with a top, annular lip 72 extending outwardly from the walls. The lip 72 engages the upper support surface 12 and holds the frame in position in the worksurface member through hole 40. The frame 50 may further include a plurality of tab members 74 extending outwardly from a bottom of one or more of the front, rear and side walls 52, 54, 56, 58. The height of the side walls 52, 54, 56, 58 may be dimensioned to match the thickness of the worksurface, such that the tab members 74 are positioned adjacent the bottom surface 14 of the worksurface. A plurality of fasteners 76, such as screws, adhesive, barbs, etc., or combinations thereof, may be used to secure the tab members 74, and frame 50, to the worksurface member. In addition, or alternatively, the frame 50 may be secured to the peripheral edges of the worksurface through opening 40 with various fasteners, including staples, screws, adhesive, etc. or combinations thereof.

In one embodiment, a longitudinally extending channel 80 is positioned along the front peripheral edge 44, 60 of the support 10, 50. It should be understood that, in one embodiment, the through opening is the same size as only the channel. The channel includes a laterally extending bottom shelf 82 secured to the front wall 52 and an upwardly extending retainer wall 84. An upper surface 90 of the bottom shelf is spaced below the upper surface 12 of the worksurface member a distance D. The channel 80 defines, in part, a mobile device support. The retainer wall 84 locates a mobile device in the channel, as well as having a top edge 87 that serves as a stop or bumper for a door 100, as further explained below. It should be understood that, in an alternative embodiment, the channel may be secured directly to the bottom surface 14 of the worksurface member and/or peripheral edge of the though opening 40 of the worksurface member. At least one of the bottom shelf 82 and the retainer wall 84 have a pass-through opening 86 formed there through. It should also be understood that, in one embodiment, the retainer wall may be eliminated all together, with the mobile device simply resting on the bottom shelf 82 and having a rear surface supported by the door.

Figure 10:
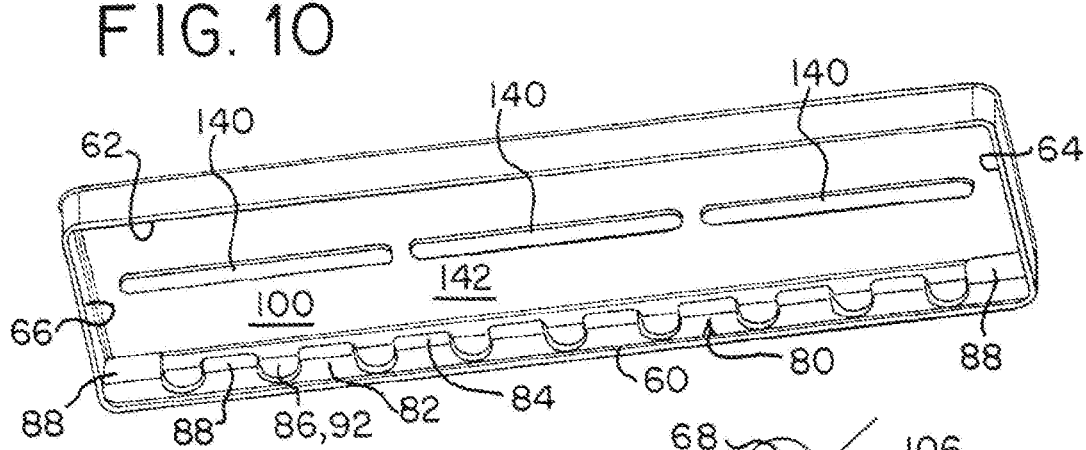
FIG. 10 is a bottom perspective view of one embodiment of a cable management system.

As shown in FIGS. 8, 10, 11 and 15, the retainer wall 84 is configured as a plurality of longitudinally spaced tabs 88 having a plurality of pass-through openings 86 defined there between. The tabs 88 may have different heights, with some of the tabs (for example the two end tabs or the second, fifth and eighth tabs) serving as bumpers and others being spaced below the door in a closed position so as to form a gap between the door and the shorter tabs. In one embodiment, each of the plurality of pass-through openings 86 also extends into the bottom shelf of the channel. As shown in FIG. 10, the pass-through openings have an arcuate shape 92, e.g., semi-circular, in the bottom shelf. It should be understood that the openings may have other shapes, including various rectangular, polygonal, triangular, or curvilinear shapes. The width W of each of the pass-through openings 86 is preferably dimensioned so as accommodate various connectors associated with corresponding power/data cords/cables. For example, in one embodiment, W is at least 15 mm, and preferably at least 17 mm. The pass-through openings 86, when formed in both the retainer wall and shelf allow a mobile device 102 to be connected to a power/data cord 104 and then disposed on the shelf 82 and in the channel 80 as further explained below. The term "mobile device," as used herein, refers to various portable electronic devices, including without limitation cell phones, including smartphones, tablets and other computers.

The channel 80 is positioned adjacent to at least a portion of the peripheral edge of the support, preferably the front edge 44, 60, whether defined by the frame 70 or the worksurface member 10, with the retainer wall 84 laterally spaced apart from the peripheral edge 44, 60 so as to form a gap G. The gap G defines a mouth of the channel 80, and preferably at least a portion of the gap G remains open, or uncovered by the door 100, in all positions of the door. In one embodiment, the entirety of the gap G remains open, while in other embodiments less than an entirety remains open, for example when the front edge of the door extends past the retaining wall.

The frame 70 further includes, in one embodiment, a pair of longitudinally spaced hubs 106 or sockets defining a longitudinally extending pivot axis 108 for a door. In one embodiment, the hubs and pivot axis are positioned adjacent a rear peripheral edge 62 of the support. It should be understood that sockets may formed directly in the peripheral edges 48, 50 of the worksurface member 10. Referring to FIG. 20, in one embodiment, the socket 306 has a U-shape hole 306, with a concave portion 308, a flat portion 309 and a pair of corner portions 310, 312. One of the corner portions 312 is oriented vertically and the other corner portion 310 is oriented horizontally.

Referring to FIGS. 1-6, 8, 10, 12, 13, 15 and 18, the cable management system, and the mobile device support in particular, also includes a door 100 moveably coupled to the support 10, 50, whether directly coupled to the worksurface member 10 or the frame 50. The door may be made of plastic, metal, or other suitable materials. In one embodiment, the door 100 includes an upper and lower substrate 136, 138, as shown for example in FIGS. 6 and 17A-C.

Figure 11:
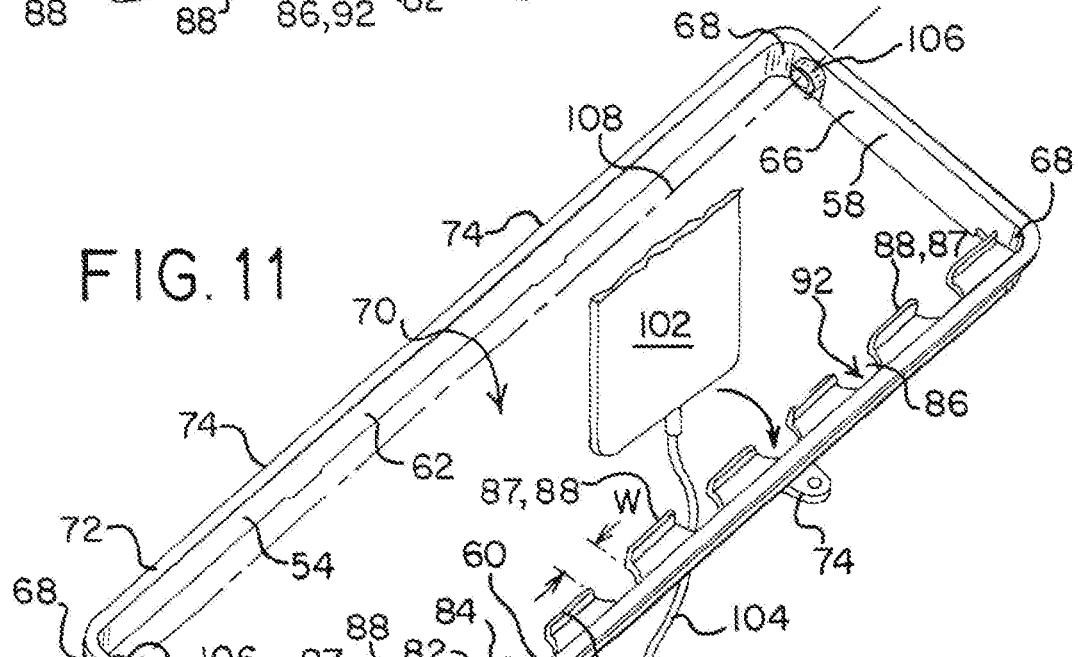
FIG. 11 is a top perspective view of one embodiment of a support.
Figure 12:
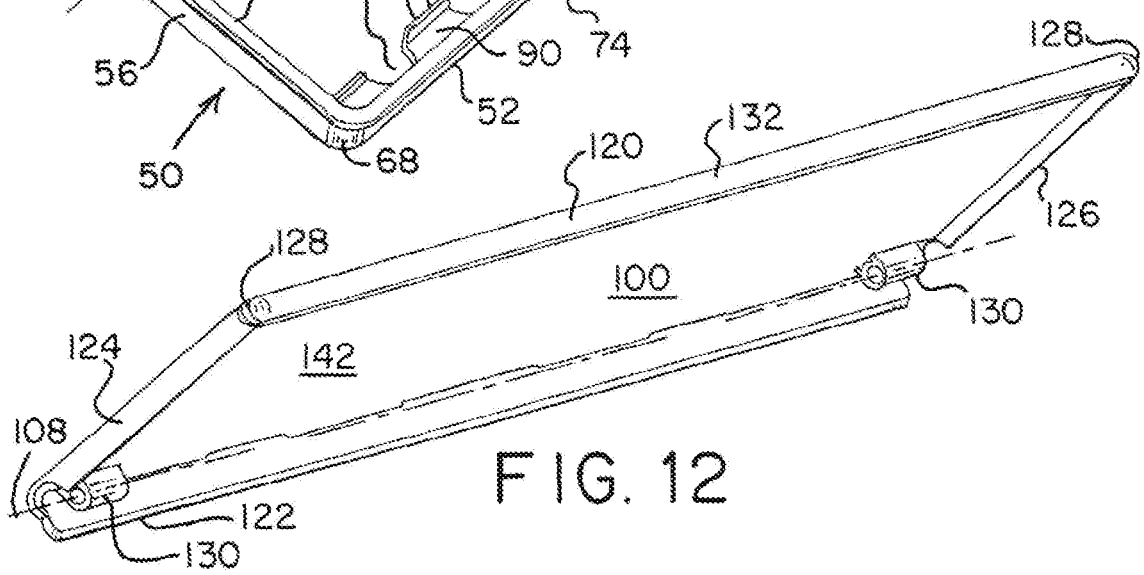
FIG. 12 is a perspective view of one embodiment of a door.

The door is moveable between a first, support position (see FIGS. 2 and 15), wherein at least a portion of the central opening 40, 70 is uncovered, and a second, closed position (FIGS. 1 and 13), wherein the same portion of the central opening 40, 70 is covered. The door may also be moved to an open position, for example at 95 degrees relative to the closed position. For example, in one embodiment, the central opening includes a first portion 110 defined by the gap G, and a second portion 112 defined between a front surface of the retainer wall 84 and the rear peripheral edge 46, 62 of the support (whether defined by the worksurface member 10 or frame 50), with the door 100 covering the second portion 112 when in the second, or closed position. The door 100 overlies and rests on the top of the retainer wall 84, or selected tab members 88 having a greater height, in the second position. For example, as shown in FIG. 11, the second, fifth (middle) and eighth tab members 88 have a greater height than the remaining tabs. In one embodiment, the mouth 110 of the channel, defined by the gap G, or at least a portion thereof, remains uncovered when the door is in the first and second positions. In this way, the user is provided with visual indicia that the channel 80 is readily available to receive and support a mobile device.

The door 100 has a plan view contour shaped to mate with the central opening of the support. For example, in one embodiment, the door has front, rear and opposite side peripheral edges 120, 122, 124, 126, all of which are linear, with curved corners 128. It should be understood that the door may have, without limitation, an elliptical (including circular), obround, oval or polygonal shape, and further that one or more of the front, rear and side peripheral edges may be linear, curved or curvilinear. The door includes a pair of longitudinally spaced hubs 130 or sockets aligned along the longitudinally extending pivot axis 108. The hubs 130 are spaced inwardly from the side edges and define gaps dimensioned to receive the hubs 106 of the support frame. A hinge pin 110 may be inserted through the hubs 106, 130, for example from an outer surface of the side walls to pivotally or hingedly join the door 100 and the frame 50. Alternatively, the hubs 130 of the door may interface directly with the hubs 106 of the support 50, for example by a snap fit. It should be understood that the door may be moved from the first to second positions by rotating and/or translating door, for example if coupled by way of a linkage assembly, and that the movement is not necessarily limited to pivoting.

Referring to FIGS. 14A-C and 16-19, the upper and lower substrates 138, 136 form a socket for the hinge pin 110.

Referring to FIGS. 16 and 17C, the hinge pin 110 has a first, insert portion 320 having a cylindrical shape with a flat surface 322, which is mated with and similarly shaped opening 324 in the upper substrate. The flat surface 322 functions as a key member that insures the proper installation and orientation of the hinge pin. The flat surface 322 also functions as a contact surface to prevent rotation between the hinge pin and door.

Referring to FIGS. 16 and 17B, the lower substrate 136 has a socket 324 positioned outboard of the opening in the upper substrate. The socket also has a pair of recess features 326 that serve as key members. The hinge pin has an intermediate portion 328 configured with a pair of ribs 330 that mate with the recesses. The recesses and ribs provide a visual guide, or indicia, to the user to identify the proper orientation of the hinge pin during installation. The interface between the ribs 330 and recesses 326 also provides a contact surface that helps to lock the hinge pin to the door and prevent relative rotation therebetween.

Figure 14A:
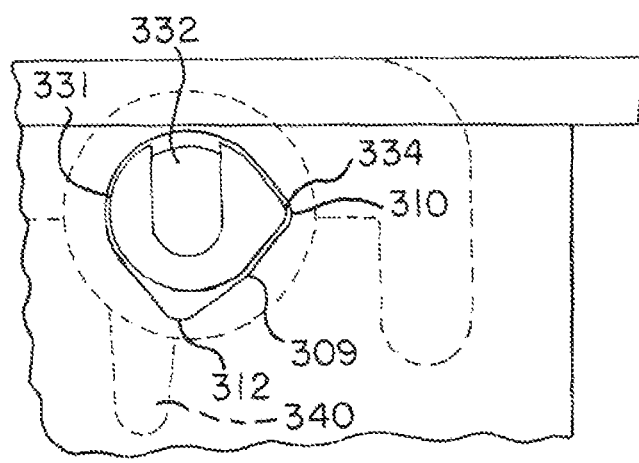
FIGS. 14A-C are enlarged side view of a hinge interface between a door and support.
Figure 14C:
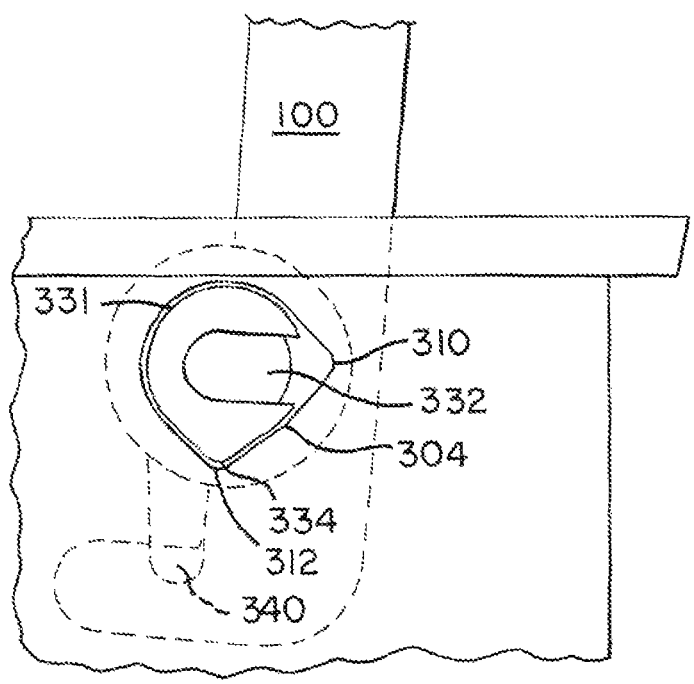
Figure 14B:
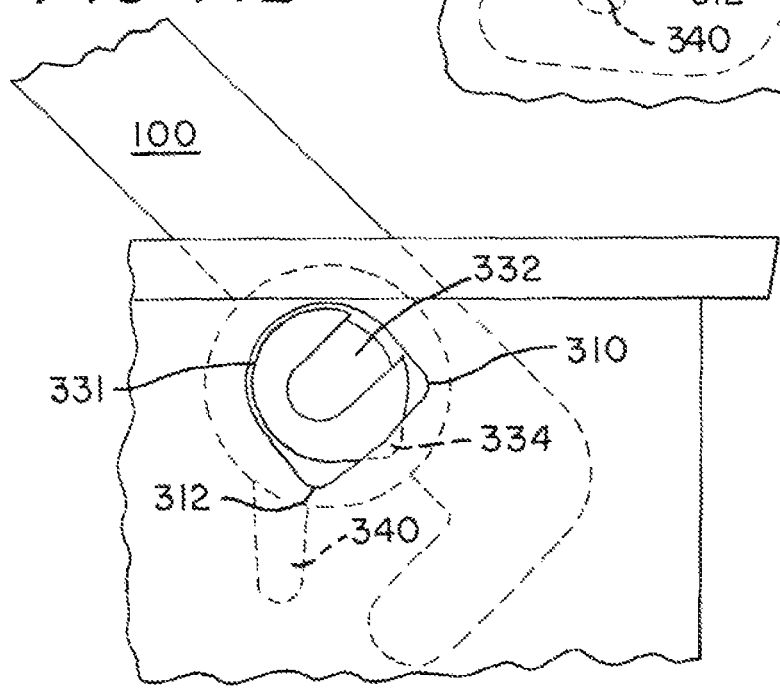

Referring to FIGS. 14A-C, 16, 17A and 20, the hinge pin has an end portion 331 with a U-shaped cavity 332, or slot, and a cross-sectional tear-drop shape configured with a protuberance 334. It should be understood that the assembly has left and right hinge pins, with the protuberance extending from opposite sides of the cavity on each of the left and right hinge pins. For example, FIGS. 17A-C show a left hand hinge pin, while FIGS. 14A-C show a right hand hinge pin. The cavity 332 allows for the protuberance 334 to be compressed during operation.

During installation, the protuberance 334 is inserted through the corner 310 formed in the frame, with the insert portion 320 and intermediate portion 328 engaging the upper and lower substrate portions 138, 136 of the door respectively. In operation, the door is opened, with the hinge pin 110 rotating with the door due to the key features (ribs and flat surface). As the door is rotated, the protuberance 334 is compressed against the flat portion 309 with an interference fit. Due to this interference, the door will be held open at a desired angular location, for example between 0 degrees and 95 degrees, and with particular frictional force between 45 and 65 degrees. For example, as shown in FIG. 14A, the door is in a closed position, with the protuberance 334 disposed in the horizontal corner 310 and functioning as a detent. As the door is rotated (FIG. 14B), the protuberance 334 frictionally engages the flat portion 309, holding the door in a desired position. In the fully open position, the protuberance 334 is disposed in the vertical corner 312, which interface functions as a detent to hold the door open. In this way, it should be understood that the hinge pin provides an infinite amount of adjustment between the closed and open positions. Referring to FIGS. 18 and 19, a stop 340 extends from the peripheral side wall 56, 58 of the frame and engages the door in a fully open position to prevent over-rotation.

The front peripheral edge 120 of the door is configured with a resilient bumper 132, made for example of rubber, silicone or other resilient material. The bumper 132 is secured in a groove 134 formed along the front edge, for example with an insert portion extending rearwardly from the bumper.

Referring to FIGS. 6-10, the door 100 may include one or more elastic storage straps 140 secured to a bottom surface 142 of the door at spaced apart locations. The storage strap(s) 140 are elastically moveable toward and away from the bottom surface 142 between the spaced apart locations. The ends 144, 146, 148 of the straps may be secured to the bottom surface by way of buttons 144, in-molded or separately attached to the straps, inserted into openings in the door, or by way of loops 146 or openings 148 secured around tabs 150 formed in the bottom surface 142 of the door, for example in a lower substrate thereof. In one embodiment the straps are aligned and extend in the longitudinal direction 2, and include three straps 140, although it should be understood that more or less straps maybe used, and that they may have different orientations, whether in the lateral direction or otherwise. The user may deposit various miscellaneous items 162, including for example and without limitation, notes, charging/data cords/cables 160 and associated connectors, etc. between the storage strap 140 the bottom surface 142 of the door. With respect to charging/data cords/cables, the storage straps provide a convenient way to manage such cords/cables/connectors when not connected to a mobile device 102, and locate the cords/cables/connectors for the user when using the system such that the user does not have to forage beneath the worksurface 10 therefor. The straps 140 may be made of rubber, silicone, elastic bands, and other suitably expandable materials.

Operation:

In operation, a user, for example with their hands or fingers 170, opens the door by lifting the door 100, for example by grasping a front edge 120 or side edge, and moving the front edge and door, for example by pivoting the door about the pivot axis 108 from a closed position, wherein the door 100 rests on the retainer wall 84 and is substantially parallel to the upper surface 12 of the worksurface, to a support position, wherein the front edge 120 is positioned rearwardly of the retainer wall 84 and above the upper surface 12. The front edge may be substantially co-planar with the worksurface in the closed position, with the phrase "substantially co-planar" understood to mean the front edge may be flush with the upper surface, slightly above the upper surface, or below the upper surface, for example within the thickness of the through opening.

The user may dispose an edge 172 (side, top or bottom) of a mobile device 102 on the bottom shelf 82 of the channel 80 such that the mobile device is supported by the bottom shelf. A rear surface 174 of the mobile device 102 may be, but is not necessarily, supported by the retainer wall 84. For example, as shown in FIG. 18, the mobile device is not supported by the retainer wall 84. As the door 102 is moved such that the front edge 120 of door is positioned above the worksurface, the front edge, which may include the resilient bumper 132, is disposed against and supports the rear surface 174 of the mobile device 102. It should be understood that the angular position α of the door 100 relative to the worksurface member may be varied to alter the angular position β of the mobile device 102 relative to a plane 176 extending orthogonal to the worksurface, with an increasing α resulting in an increasing β, although not necessarily in a one-to-one relationship.

Figure 2:
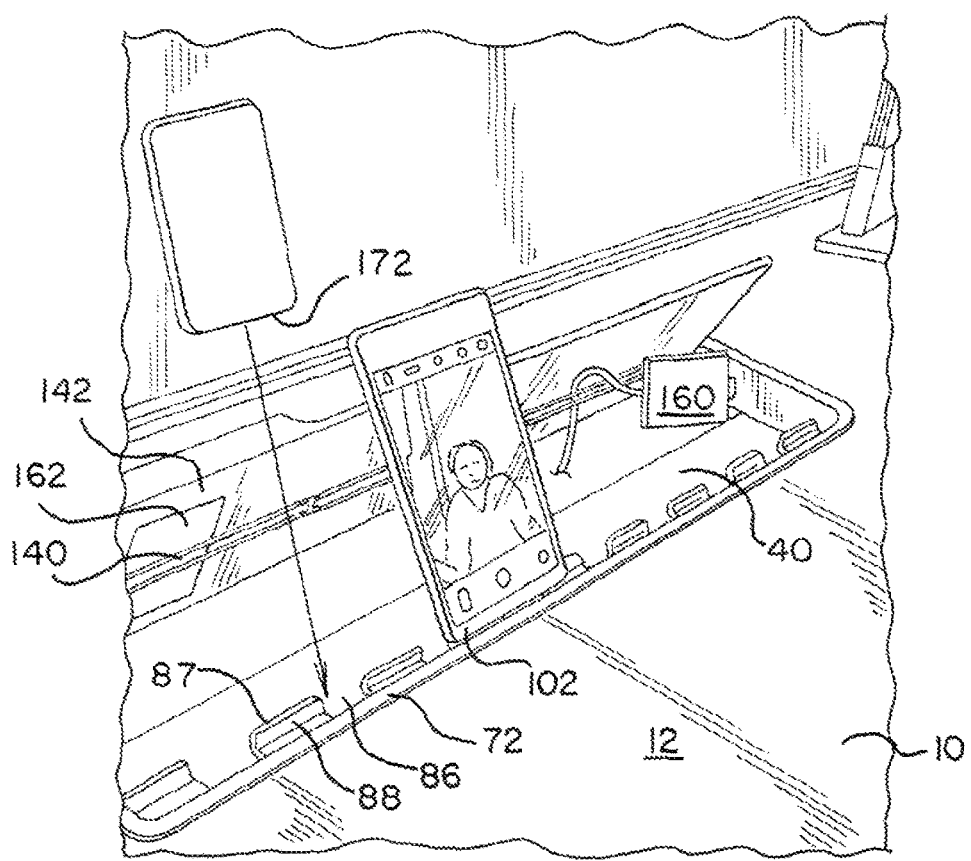
FIG. 2 is an enlarged partial view of a cable management system with a mobile device support integrated into a worksurface.

Prior to, or after, positioning the mobile device in the channel, a power/data cord/cable 104 may be connected to the mobile device 102. The cord/cable 104 is routed through pass-through opening 86, either before or after making the connection. As shown in FIG. 2, it should be understood that a plurality of mobile devices 102 may be disposed in the channel 80 and have edges 172 thereof supported by the bottom shelf 82, with each of the plurality of mobile devices being positioned adjacent one of the pass-through openings 86 to accommodate a respective cord/cable 104. It should also be understood that the front edge 120 of the door may engage and support the rear surface of each of the plurality of mobile devices 102.

It should be understood that the pass-through opening also provide a conduit for various power and data cords to be passed from beneath the worksurface to various electronic devices, for example a mobile device 102, situated or resting on the upper surface of the worksurface as shown in FIG. 1, rather than being disposed in the channel.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. A cable management system comprising:
a support having a peripheral edge defining a central opening and comprising a longitudinally extending channel having a laterally extending bottom shelf and an upwardly extending retainer wall, at least one of said bottom shelf and said retainer wall having a pass-through opening formed there through, wherein said channel is positioned adjacent to a portion of said peripheral edge of said support with said retainer wall laterally spaced apart from said portion of said peripheral edge so as to form a gap there between, wherein said gap defines a mouth of said channel; and
a door moveably coupled to said support, said door moveable between a first position, wherein at least a portion of said central opening defined by said support is uncovered, and a second position, wherein said at least said portion of said central opening defined by said support is covered.

2. The cable management system of claim 1 wherein said mouth of said channel is uncovered when said door is in said first and second positions.

3. The cable management system of claim 2 wherein said portion of said peripheral edge comprises a front edge, and wherein said peripheral edge further comprises a rear edge, wherein said door is pivotally coupled to said support adjacent said rear edge.

4. The cable management system of claim 3 wherein said door comprises a front edge having a resilient bumper, wherein said front edge of said door is positioned rearwardly of said retainer wall when said door is in said first position.

5. The cable management system of claim 1 wherein said retainer wall comprises a plurality of longitudinally spaced, upwardly extending tabs.

6. The cable management system of claim 5 wherein said retainer wall has a plurality of said pass-through openings defined between said upwardly extending tabs.

7. The cable management system of claim 6 wherein each of said plurality of pass-through openings extends into said bottom shelf of said channel.

8. The cable management system of claim 7 wherein said pass-through openings have an arcuate shape in said bottom shelf of said channel.

9. The cable management system of claim 1 wherein said support comprises a ring-like frame.

10. The cable management system of claim 1 wherein said door comprises an elastic storage strap secured to a bottom surface of said door at spaced apart locations, said storage strap being moveable toward and away from said bottom surface between said spaced apart locations.

11. A worksurface assembly comprising:
a worksurface member having an upper support surface, a front edge, and a through opening, said through opening defined in part by a front peripheral edge;
a longitudinally extending channel coupled to said worksurface member and having a laterally extending bottom shelf and an upwardly extending retainer wall, at least one of said bottom shelf and said retainer wall having a pass-through opening formed there through, wherein said channel is positioned adjacent to said front peripheral edge with said retainer wall laterally spaced apart from said front peripheral edge so as to form a gap there between, wherein said gap defines a mouth of said channel; and
a door moveably coupled to said worksurface member, said door moveable between a first position, wherein at least a portion of said through opening is uncovered and a front edge of said door is positioned above said upper support surface, and a second position, wherein said at least said portion of said through opening is covered and said front edge is substantially coplanar with said worksurface member.

12. The worksurface assembly of claim 11 wherein said mouth of said channel is uncovered when said door is in said first and second positions.

13. The worksurface assembly of claim 12 wherein said through opening is further defined in part by a rear peripheral edge, and wherein said door is pivotally coupled to said worksurface adjacent said rear peripheral edge.

14. The worksurface assembly of claim 12 wherein said door comprises a front edge having a resilient bumper, wherein said front edge is positioned rearwardly of said retainer wall when said door is in said first position.

15. The worksurface assembly of claim 11 wherein said retainer wall comprises a plurality of longitudinally spaced, upwardly extending tabs.

16. The worksurface assembly of claim 15 wherein said retainer wall has a plurality of said pass-through openings defined between said upwardly extending tabs.

17. The worksurface assembly of claim 16 wherein each of said plurality of pass-through openings extends into said bottom shelf of said channel.

18. The worksurface assembly of claim 17 wherein said pass-through openings have an arcuate shape in said bottom shelf of said channel.

19. The worksurface assembly of claim 11 wherein said worksurface member comprises a ring-like frame defining said through opening.

20. The worksurface assembly of claim 11 wherein said door comprises an elastic storage strap secured to a bottom surface of said door at spaced apart locations, said storage strap being moveable toward and away from said bottom surface between said spaced apart locations.

21. A method of supporting a mobile device comprising:
moving a door from a first position, wherein a front edge of said door is positioned above a worksurface, to a second position, wherein said front edge of said door is substantially coplanar with said worksurface;
supporting an edge of said mobile device on a bottom shelf of a channel coupled to said worksurface when said door is in said first position, said channel having a retainer wall positioned adjacent a rear surface of said mobile device, wherein one of said bottom shelf and said retainer wall have a pass-through opening positioned adjacent said mobile device;
supporting said rear surface of said mobile device with said front edge of said door when said door is in said first position; and routing a cable through said pass-through opening and connecting said cable to said mobile device.

22. The method of claim 21 wherein said front edge of said door comprises a resilient bumper, wherein said supporting said rear surface of said mobile device with said front edge of said door comprises engaging said rear surface of said mobile device with said resilient bumper.

23. The method of claim 21 wherein said retainer wall comprises a plurality of longitudinally spaced, upwardly extending tabs, wherein said retainer wall has a plurality of pass-through openings defined between said upwardly extending tabs, and wherein each of said plurality of pass-through openings extends into said bottom shelf of said channel, and wherein said supporting said edge of said mobile device on said bottom shelf of said channel comprises supporting edges of a plurality of mobile devices on said bottom shelf of said channel, wherein each of said plurality of mobile devices is positioned adjacent one of said pass-through openings.

24. The method of claim 23 wherein said pass-through openings have an arcuate shape in said bottom of said channel.

25. The method of claim 21 wherein said worksurface member comprises a ring-like frame, wherein said door is pivotally coupled to said frame.

26. The method of claim 21 wherein said worksurface comprises an upper support surface, a front edge, and a through opening, said through opening defined in part by a front peripheral edge, wherein said retainer wall is spaced apart from said front peripheral edge to define said channel.

\* \* \* \* \*